Figure 1:
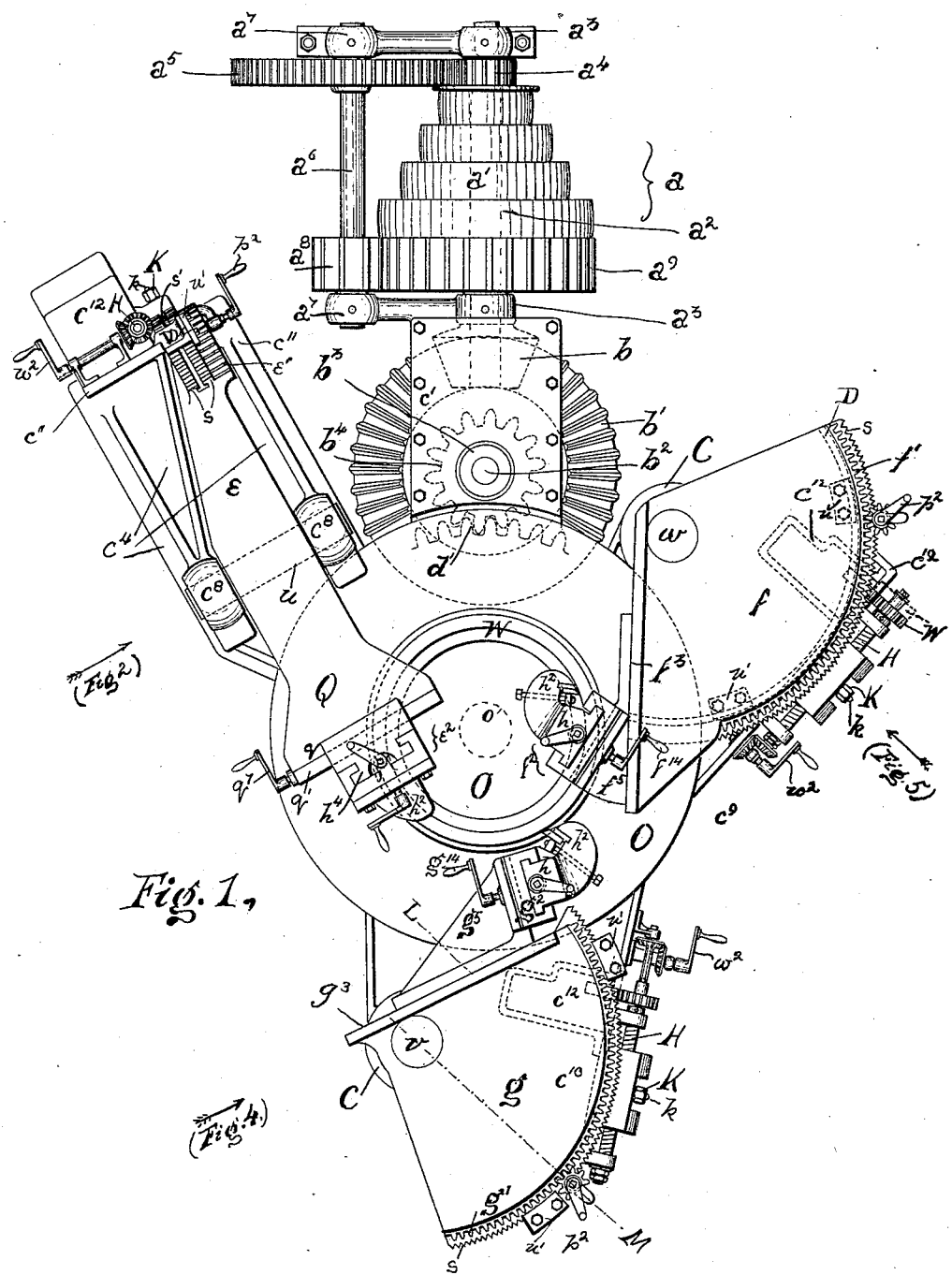

(No Model.) 6 Sheets—Sheet 1.

F. W. TAYLOR.
BORING AND TURNING MILL.

No. 429,162. Patented June 3, 1890.

WITNESSES
INVENTOR
Frederick W. Taylor
By his Attorney (No Model.) 6 Sheets—Sheet 2.

F. W. TAYLOR.
BORING AND TURNING MILL.

No. 429,162. Patented June 3, 1890.

(No Model.) 6 Sheets—Sheet 3.

F. W. TAYLOR.
BORING AND TURNING MILL.

No. 429,162. Patented June 3, 1890.

WITNESSES

INVENTOR
Frederick W. Taylor,
By his Attorney (No Model.)  
6 Sheets—Sheet 5.

F. W. TAYLOR.
BORING AND TURNING MILL.

No. 429,162. Patented June 3, 1890.

(No Model.) 6 Sheets—Sheet 6.
F. W. TAYLOR.
BORING AND TURNING MILL.
No. 429,162. Patented June 3, 1890.
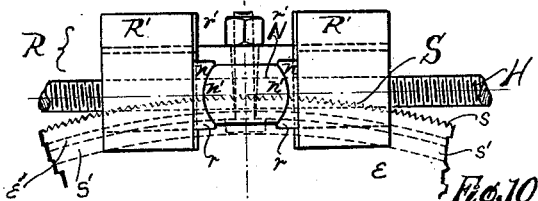
Fig. 10.
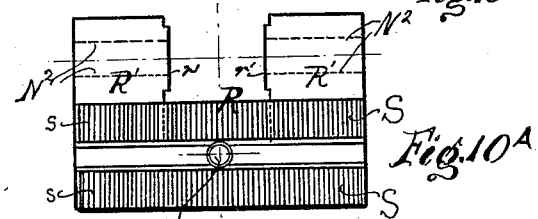
Fig. 10<sup>A</sup>
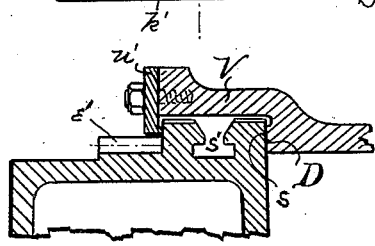
(Section C---D)
Fig. 7.
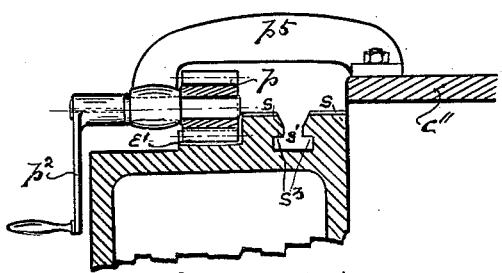
(Section A---B)
Fig. 6.
(Section E---F)
Fig. 8.
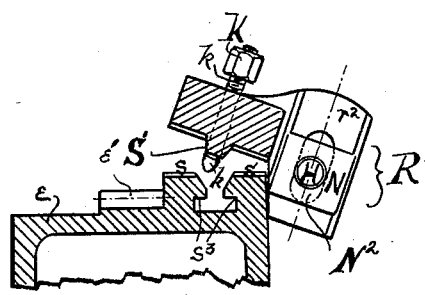
(Section G H)
Fig. 9.
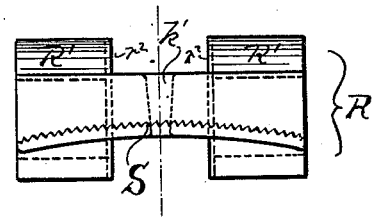
Fig. 11.
WITNESSES:
Francis T. Chambers
Joshua Matlack, Jr.
INVENTOR
Frederick W. Taylor
BY H. W. Han Powel
ATTORNEY
THE NORRIS PETERS CO., PHOTO-LITHO., WASHINGTON, D. C.

UNITED STATES PATENT OFFICE.

FREDERICK W. TAYLOR, OF PHILADELPHIA, PENNSYLVANIA.

BORING AND TURNING MILL.

SPECIFICATION forming part of Letters Patent No. 429,162, dated June 3, 1890.

Application filed December 11, 1889. Serial No. 333,337. (No model.)

*To all whom it may concern:*

Be it known that I, FREDERICK W. TAYLOR, a citizen of the United States, residing in the city and county of Philadelphia, in the State of Pennsylvania, have invented a certain new and useful Improvement in Boring and Turning Mills, of which the following is a specification.

Heretofore boring or upright turning mills have customarily consisted of a vertical mandrel crowned by a transverse "table" or "face-plate," the whole rotatably journaled and concentrically disposed within a circular frame having opposite upright standards bridged by a cross-head, upon which latter, by means of a traversing carriage or carriages one or more tool-supporting slide-rests carry tools, drills, &c., much after the manner of a "metal planing" machine; and, while continuous revolving instead of rectilinear reciprocating of the work-carrying table serves to distinguish these machines into distinct classes, the analogy between boring-mills and planing-machines has become still more pronounced in the recent forms of such mills which use broad-nosed tools and take heavy cuts upon large work, for these mills, being now usually provided with an adjustable step to their mandrel-spindles, admit, when it is desired for increased steadiness in the action of their face-plates or tables, resting them upon auxiliary bearings fashioned integral from the machine's frame. The latter for this purpose extends in an annular seat beneath such table's outer flanges, and thereby affords them, as it were, a circular track on which to revolve. The movable tool-supporting carriages' slide-rests and the feed-motion mechanisms of both classes of these machines are also usually so far identical that in both prismatic guides control the movements of the various sliding members which traverse across or are fed to and from the tables thereof with rectilinear movements. The general construction is to give broad soles and the most solid possible backing to the several sliding parts of which their tool-supports are composed, and these supports are, as far as possible, calculated to deliver the thrusts derivable from the tools they carry by other broad soles and mutual compression onto the more substantial backing of the machine's solid bed-bearing surfaces as distinguished from drawing away or discharging them onto V-guides and the rabbeted or undercut portions of their engaging and guiding parts. For these reasons, while two or more tool-supporting carriages are frequently placed upon the cross-head of a boring-mill and put into operation at the same time, the best practice has been when operating at two points on opposite sides of the center of rotation to call upon that tool which is backed up by the vertical bed-supports of the cross-head to meet the heavier duty—such as that of roughing or taking outside cuts—while the other tool, which works across the center of revolution, being subjected to strains in the opposite direction, and thereby having a tendency to be pulled off of or away from its supports, is, for fear of springing or destroying them, called on only for the lighter acts of finishing, &c.; but as the boring-mills and lathes of this class may be called upon not only to support broad-nosed tools, but to act by direct infeed until as the work continuously rotates past such tool the entire reduction is effected immediately over either the whole or a very considerable width of the face of the work, (as distinguished from the older method of consecutive feedings followed by the consecutive taking off of cut after cut with narrow-nosed or sharp-pointed tools,) they may be thus called upon to withstand strains and operate in a way which is almost unheard of in the planing-machines and lathes of the more ordinary sort. Yet, so far as I am aware, even those especially built for the heaviest work have been built, as above mentioned, upon the same old lines and common bases of construction, and if used with a broad-nosed tool, forced into the work by a direct infeed, they are commonly subject to chatter and vibrate with detriment both to themselves and the production.

Now the chief objects of my present invention are, first, to dispense with the straddling planer-like cross-head and upright standards as obstructions to free access to the face-plate or revolving table of a boring-mill, and to facilitate the applying, adjusting, securing, releasing, and removing of the work, and to those ends to devise novel mechanism to support the tool or tools they carry; second, to distribute and fashion the mechanism of such improved mill, (if using more than one tool at a time,) so as to prevent as far as possible the shifting and dislocation of the work from its established center of rotation, and by applying the principle of "cranked tools" to the tool-supporting parts themselves to thereby reduce the vibration and chatter of the tools they carry; third, to operate upon a maximum of surface, preferably at several points contemporaneously, by stubby broad-nosed tools, all similarly supported and acting with direct infeeds; fourth, to give the tool-supporting carriage or carriages of my improved device a capacity to retreat from the "swing" or range of the face-plate or table of the mill or to return thereto without necessarily disturbing the tool or its holder from the established adjustment effected by its immediate slide-rest members; fifth, to effect this by vibrating movements, pivotal carriages, and suitable carriage-fixing mechanism; sixth, to combine circular and rectilinear feed-motions in the mechanism of the several tool-supports; seventh, to provide for both a swift retreat and a swift return of my tool-supporting carriages from their working to their possible non-active ranges of position, and vice versa, and to that end, eighth, to devise mechanism for disconnecting and throwing the circular feed-motion mechanism at will out of gear with the pivoted tool-supporting carriages; ninth, to preferably fashion said carriages as pivoted "sectors" and provide them with a "quick-traverse" mechanism, preferably a rack and pinion; tenth, to provide guide-soles and segmental supports to maintain the pivoted sector-carriages in correct alignment when in motion, as well as to thereby absorb strains, prevent vibration, and reduce the duty otherwise put upon their pivotal connections; eleventh, to devise a suitable frame or housing wherein the whole may be both assembled and operated, together with such other novel features as are set forth by the following claims.

Figure 2:
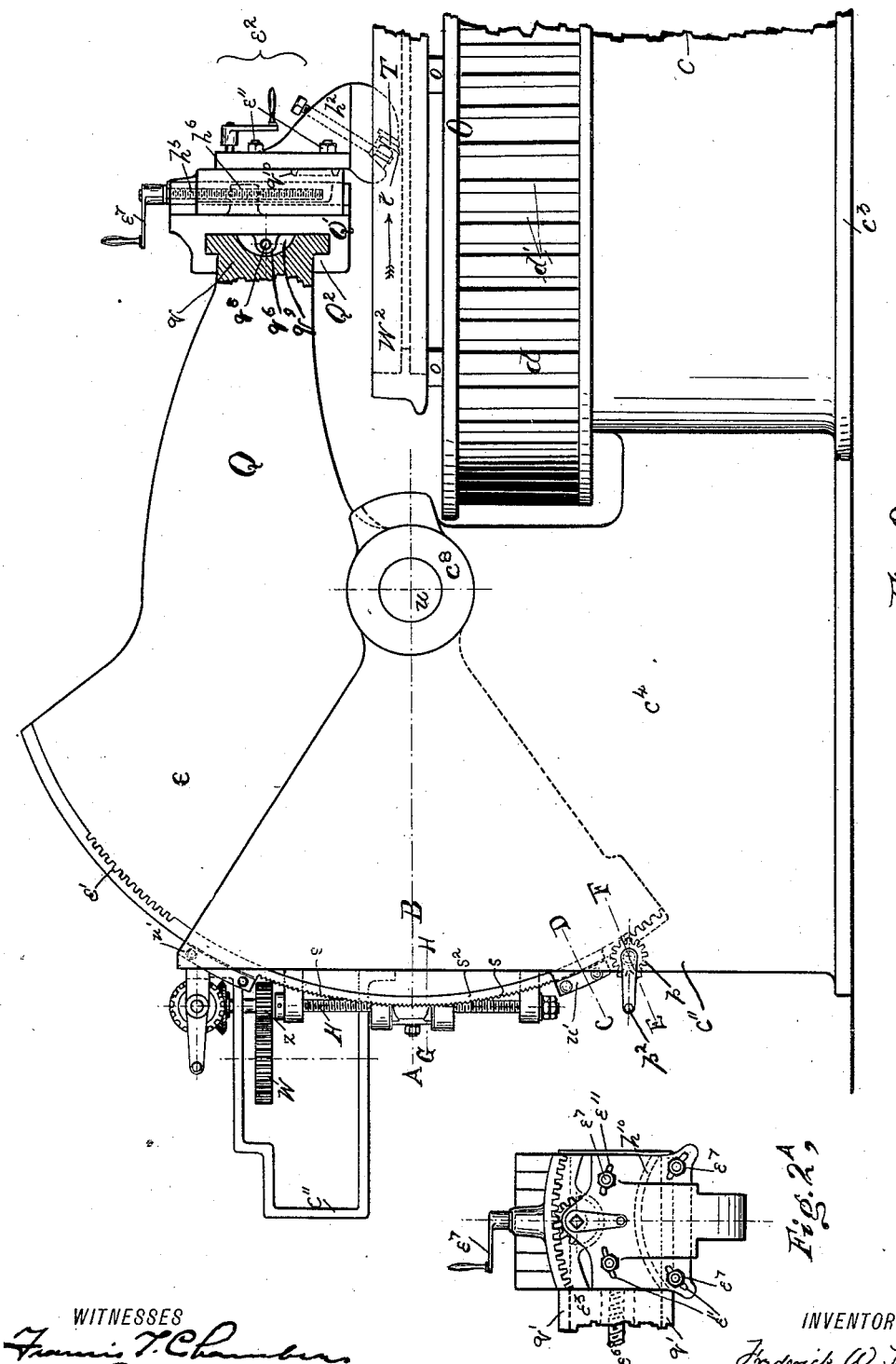
Figure 3:
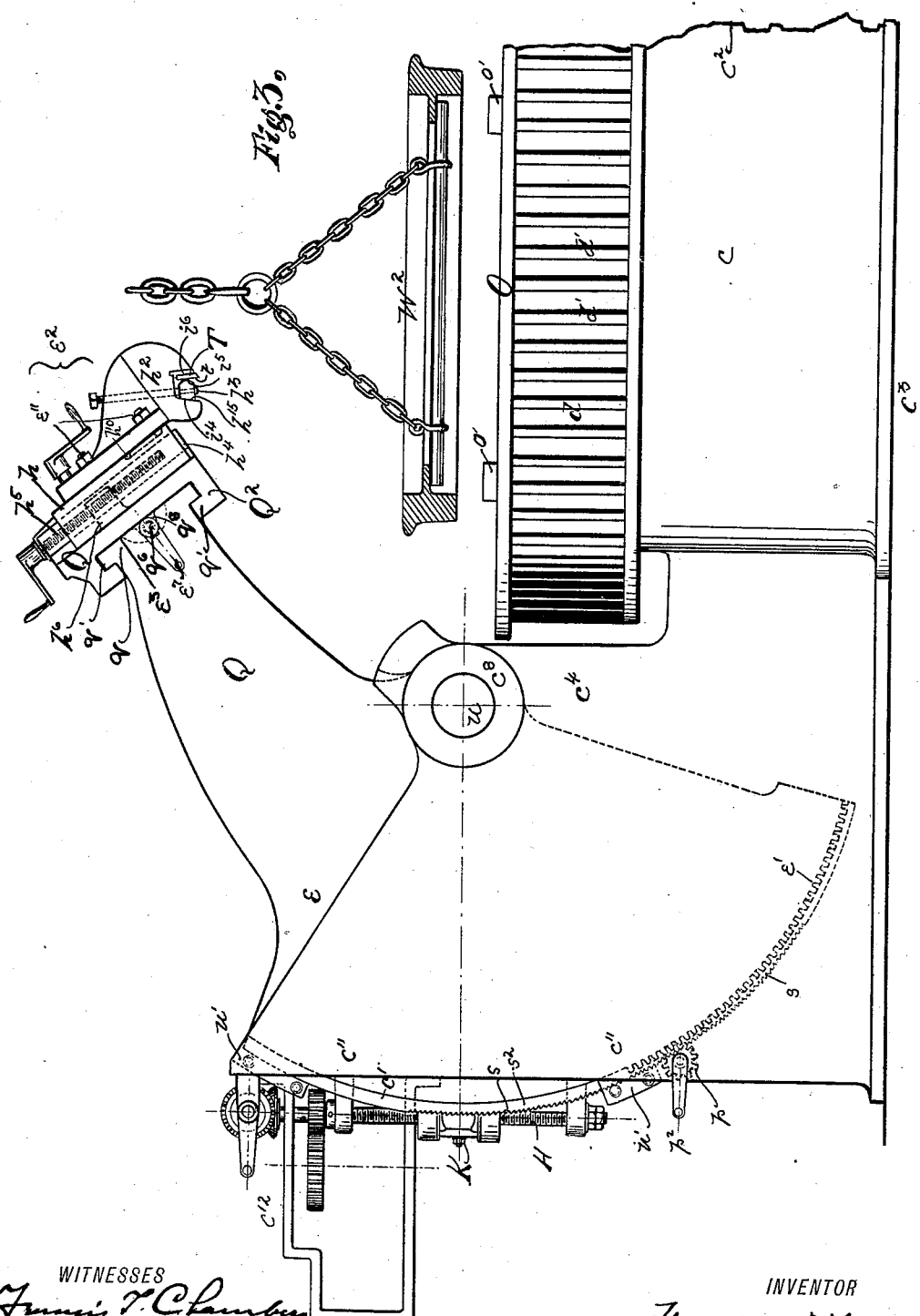
Figure 4:
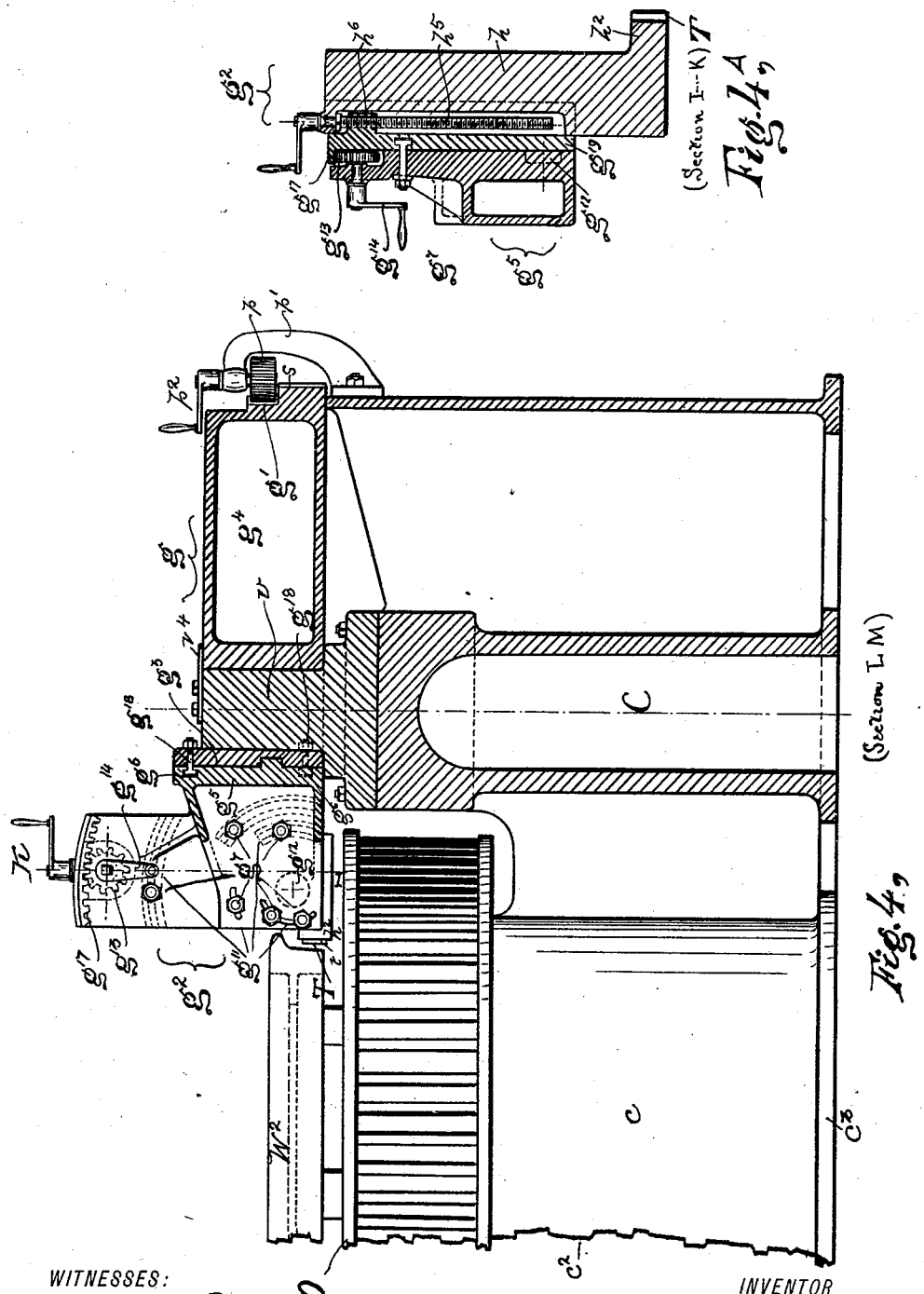
Figure 5:
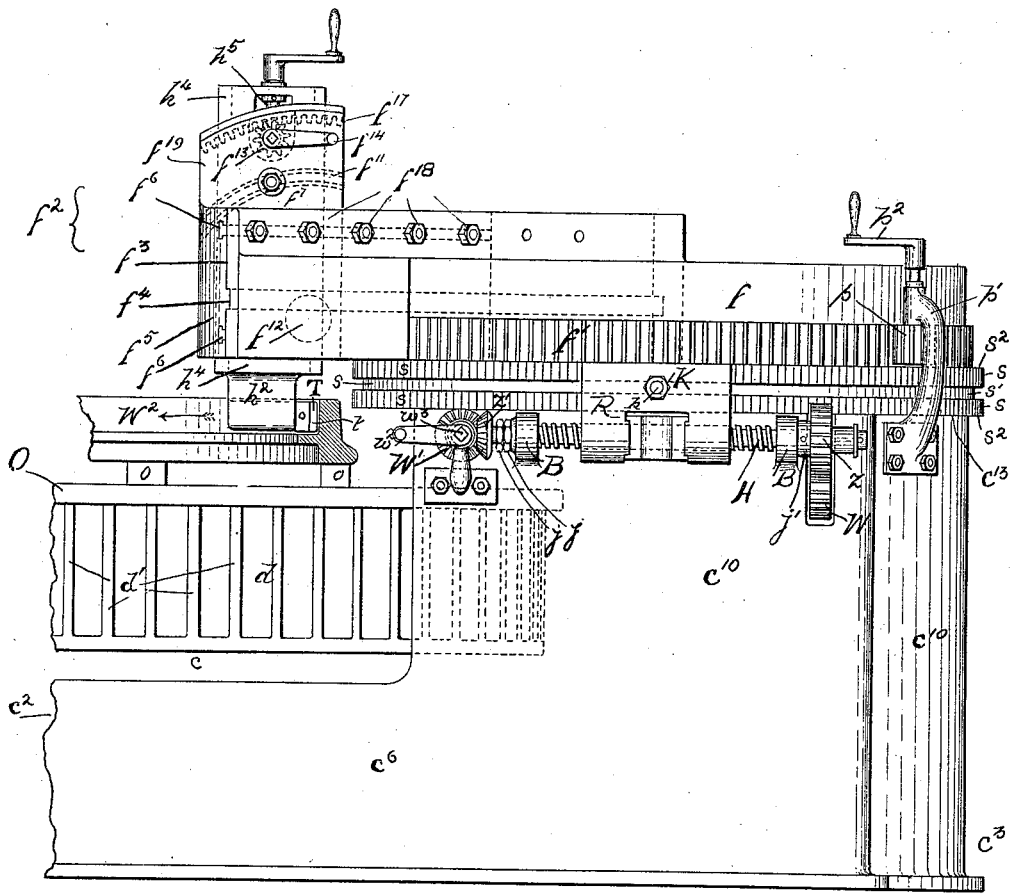

Reference now being had to the accompanying drawings, forming part of this specification, in which similar letters of reference indicate corresponding parts throughout the several figures, they will be found to illustrate my present invention as follows, to wit:

Figure 1 is a plan view of a boring-mill of my present improved construction throughout, the outline of the foot of its frame being omitted for the sake of clearness in the parts shown. Fig. 2 is a side view of a portion of the structure shown in Fig. 1, the view being inward obliquely from the left-hand side of the latter figure, as indicated by an offset arrow. Fig. 3 is a side view of the same parts from the same point of view as Fig. 2, the work, a railway-vehicle's tire, being here represented as slung and in the act of being swung in and lowered to place upon the lathe face-plate or boring-mill table, for which purpose the pivoted carriage is shown lifted. Fig. 4 is a side view, partially in section, of that portion of the structure shown in Fig. 1 which lies at the end opposite the driving-pulley, the point of view from which it is taken being nearly at right angles to the zigzag broken line L M, indicative of its plane of section through the structure of Fig. 1. (See offset sight-arrow.) Fig. 5 is a side elevation of another portion of the machine, the point of view being from a position substantially opposite to that from which Figs. 2 and 3, above were taken. This view comprises the "inside" tool-carriage, the tool-supporting slide-rest, and actuating feed mechanisms thereof, just as Figs. 2, 3, and 4 above respectively illustrate the "facing" and "outside" tool-carriages with their corresponding immediate equipment. Fig. 2$^A$ is a detail of a fragment, being an end elevation of the traverse-guide and sliding tool-supporting parts and tool-holder situated on the inner end of the carriage-arm shown in Fig. 2, as seen when looking outward from within over the machine's table. Fig. 4$^A$ is a further detail, being a sectional elevation of the slide-rest and tool-holder shown in Fig. 4, of which latter figure the median dot-and-dash line I K denotes the plane of section, the view being at right angles thereto looking inward and the scale somewhat increased. Fig. 6 is a median section of a fragment on a considerably-enlarged scale, taken on a plane passing vertically through the dot-and-dash line A B of Fig. 2. (See also same line in enlarged detail given in Fig. 11 herewith.) Fig. 7 is a similar section through a further enlarged fragment on line C D of Fig. 2. Fig. 8 is a similar section through further enlarged fragment on line E F of Fig. 2. Fig. 9 is a similar section through further enlarged fragment on line G H of Fig. 2, the structure here being closely associated with that shown in Fig. 6 above, Figs. 10, 10$^A$, and 11 being details of structure shown in Figs. 6 and 9, Fig. 10$^A$ being a front elevation of the structure shown in Fig. 11.

In general, Fig. 1, $a$ offsets the ordinary boring-mill head-driving mechanism, which consists of the "cone" belt-pulley $a'$, loosely and rotatably mounted upon spindle $a^2$, journaled in the housings $a^3 a^3$, but carrying fixed to it the spur-wheel $a^4$. This, meshing with the back-gear train's pinion $a^5$, serves to actuate the counter-spindle $a^6$ in its bracket-housing bearings at $a^7 a^7$, and by the fast gear $a^8$, intermeshing with drive-gear $a^9$, thereby rotates aforesaid pulley-spindle with great increase of power. Now this spindle, being rotatably connected by the miter-gears $b\ b'$, fastened, respectively, to itself and the vertically-placed shaft $b^2$, rotates the same in suitable bearings $b^3$, (of which the lower or step bearing is not shown,) fashioned, respectively, in the lower interior portion or step of the machine's main frame $c$, Figs. 2, 3, 4, and 5, and above in the removable cross-plate $c'$, (see Fig. 1,) and said shaft, carrying the fixed spur-wheel $b^4$, intermeshes with the teeth $d'$ of the gear $d$, formed integral upon the outside body of the face-plate or boring-mill table O. The latter table O, being mounted transversely to its vertical mandrel, (indicated at $o$ by dotted outline end view in Fig. 1,) is thereby horizontally, concentrically, and rotatably mounted above the hollow cylindrical guard-shell $c^2$, Figs. 2, 3, 4, and 5, of the aforesaid main frame, all of which, (save for the absence of cross-head uprights on said frame,) being parts intended to be in no wise different from, but actually illustrative of, corresponding parts in ordinary boring-mills, need no further illustration nor mention, except as they are combined with the following novel features: From the sides of this mill's aforesaid frame-shell $c^2$, and united to its foot $c^3$, lateral extensions $c^4$ $c^5$ $c^6$ (see Figs. 2, 3, 4, and 5, respectively) carry suitable housings—viz., the web-supported bearings $c^8$ $c^8$ of the swinging "facing-tool" carriage's trunnion $u$, Figs. 1, 2, and 3, and the hollow columnar pedestals C C, Fig. 4—to and upon which are respectively secured the vertical pivots $v$ $w$, about which the "inside" and "outside" tools' swinging carriages respectively vibrate. Further webbed extensions $c^9$, Fig. 4, $c^{10}$, Fig. 5, and $c^{11}$, Fig. 2, afford for these swinging tool-carriages convenient points for locating their several circular feed-motion mechanisms. To the sides of the extensions $c^9$, $c^{10}$, and $c^{11}$ hollow box-like castings $c^{12}$, removably bolted, afford convenient bearings, housings, and safeguards to their several automatic feed-motion connections; but before considering the mechanism which these sub-extensions of the frame support, reference being had to the tool-carriages themselves $e$ $f$ $g$, they will be seen, Figs. 1, 2, 3, and 4, to consist each of a main body, preferably a sector-like casting, the circular rim portions (arcs) of each of which carry fixed upon them, first, correspondingly-curved racks $e'$ $f'$ $g'$, and, second, immediately adjoining thereto, but preferably projecting slightly farther from their centers of vibration, (the axes of the pivots $u$ $v$ $w$,) the transversely-disposed parallel serrated flange-ribs $s$ $s$, which ribs are separated by an intermediate concentric T-headed slot $s'$, Fig. 6. These swinging carriages $g$ and $f$, which range from clear or tangential to radial positions across the bed O, being substantially counterparts, I preferably provide on their straight sides adjoining the face-plate bed O aforesaid with slide-rests $g^2$ $f^2$. (Here shown with ordinary direct-acting hand feed-motion mechanisms.) To these rests the said carriages' plane soles $g^3$ $f^3$ and lengthwise grooves $g^4$ $f^4$ respectively furnish guide parts and clamping-bases, for into them the registering tongue-provided pivot-bearing bracket-bases $g^5$ $f^5$ of the slide-rests aforesaid are fitted to snugly slide or else to be anchored thereon at any desired longitudinal adjustment by the T-headed slots $g^6$ $f^6$, Figs. 4 and 5, and their engaging screw-bolts $g^8$ $f^8$. The circular T-headed slots $g^{11}$, Fig. 4, in the projecting slide-guiding member $g^{19}$ $f^{19}$ of the brackets and their corresponding slots $f^{11}$ in Fig. 5 permit those rests' outer interguiding slide members to be mutually pivoted and adjustably clamped to their bracket-shaped lower sole-attaching members $f^5$ $g^5$ aforesaid, to which end the pivots $g^{12}$ $f^{12}$ form the centers of rotation, and the crank-handles $g^{14}$ $f^{14}$ of the pinions $g^{13}$ $f^{13}$, rotatably mounted by their shafts $g^{15}$ $f^{15}$ to bearings $g^{16}$ $f^{16}$ in the aforesaid brackets, (see Fig. 4$^A$,) by intermeshing with the curved rack-work fashioned on the adjoining or guide-block part, afford the machine-driver a convenient means of imparting angular adjustments, the slide-rest binding-screw bolts $g^7$ $f^7$ being sufficiently relaxed for the purpose; otherwise these latter bolts, being screwed fast, secure the slide-rest members proper upon their bracket-bases at any desired angular divergence to the lathe-table O. I also, preferably, provide these rests with a tool-holding part $h^2$, consisting, preferably, of a mandible or fixed and movable jaws, which, in the case of the rests on $g$ and $f$, is, save its movable jaw, formed integral with the tool-slide itself. The prismatic guides and projecting T-headed engagements of these slides, being enveloped in their registering grooved and undercut inter-rabbeted guide-blocks $g^{19}$ $f^{19}$, Fig. 4$^A$, are thereby, in accordance with my stated scheme of construction, adapted to be pulled outward and away from their supports if at all under the drag of the tools which they bear when in operation. Adjustments and, if need be, feed-motions lengthwise of said guide-grooves are effected by the cranked handle-bearing slide-screws $h^5$, which, being journaled in the usual way for slide-rest screws to the slides $g^{20}$, Fig. 4, and engaging with registering nuts $h^6$, attached to their respective guide-blocks, serve to move or adjustably secure the slide members $h^2$ $h$ in the ordinary well-understood method of actuating slide-rests' sliding parts. Now, in addition to these features of the slide-rests $f^2$ $g^2$, carried by the angular brackets adjustably bolted onto the soles of $f$ and $g$, the sector-carriage $e$, Fig. 3, which is trunnioned to swing at right angles to their plane, or, in other words, to and from the face of the bed, instead of transversely in and out in a plane parallel to and across its face, as $f$ and $g$ are contrived to do, has projecting from it, near its trunnion $u$, an integral inwardly-reaching arm Q. Of this arm the free end is fashioned by the flanges $q'$ $q'$ into a prismatic crosswise guide $q$, upon which a third tool supporting and traversing slide-rest $e^2$ is carried by a saddle Q', whose rabbeted foot Q$^2$ is adapted to embrace and slide upon $q$ as a guide. Lengthwise adjustments and, if need be, "feeds" along it are effected by means of the rotatably-journaled hand-screw $q^6$, which, as shown in Figs. 2 and 3, being journaled in the side walls of the cross-guide $q$, lies inclosed within the groove $q^9$ and engages with the nut or tapped lug $q^8$, that extends integral from or is rigidly secured to and centrally beneath the middle inner body of $Q'$. The outer opposite surface of said saddle being provided with a T-headed prismatic guide $h^4$, (see Fig. 1,) turned at right angles to its hollow foot-guides $Q^2$, carries by means thereof, with nut $h^6$, Figs. 2 and 3, and cranked hand-screw $h^5$, (rotatably journaled to the slide-block $h$,) said slide-block. This block here in turn carries, as best illustrated by taking Figs. 2 and $2^A$ in conjunction, upon its flat outer surface an independent and pivoting tool-holder $h^2$. The parts are centered by means of the tongue-and-groove pivot-arcs $q^{10}$ $h^{10}$, and are adjustably securable by the clamping-screw bolts $E^{11}$, engaging with said slide-block through the concentric circular slots $E^7$ $E^7$ of this tool-holder, which, save for its independent circular adjustability, is in other respects the counterpart of the tool-holders on $g$ and $f$.

Fig. 3 illustrates the tool-binding mechanism, consisting of a screw-bolt $i$, which, passing through a suitable hole $i'$ in the fixed jaw of tool-holder $h^2$, issues from back thereof, and there engaging with the nut $i^2$ serves to draw the beveled lower face $h^{15}$ of its wedge-shaped movable jaw $h^3$ (which is preferably pivotally connected to said screw's shank) not only against the adjoining incline palate $i^4$ of the mouth of said holder, but thereby also to crowd its dome-shaped opposite side $i^5$ against the top of the slightly-protruding tool T. The latter is thereby forced firmly to its seat on the lower jaw-face $i^6$, and the tool's cutting-face $t$ here, as is also the case of both the tools borne by the swing-carriages $g$ $f$, is turned toward the interguiding parts of the rest which carries it as well as toward the pivotal connection of its carriage proper. By this means I accomplish in all three of the machine's swinging carriages one of the chief objects of my invention—that is to say, as the work W, which in this case is a tire, is presumably securely fastened to the lathe face-plate or table O by the chuck-dogs $o'$ $o'$, Figs. 2 and 3, it is thereby drivable with a circular motion, and such motion being communicated to it by the driving mechanism in the ordinary way. The feed-screw handles of the traversing slide-rest of the carriage $e$ (which carriage for the present is to be considered locked to the adjacent extensions of the machine's frame, as by screwing fast the clamps shown at $u'$ $u'$, Figs. 3 and 7) being now called into play, the tool T can be brought to bear and fed into the upper face of said tire. Then, the direction of the bed rotation being as indicated by the curved arrow adjoining the slide-rest $e^2$, Fig. 1, the tool which $e^2$ carries will be in receipt of forces tending upward and outward from the work as well as outward and away from the several sliding supports of its rest, the effect of which is, if not actually to deflect and bend the carriage-extension Q and carriage $e$ in the resultant direction of such forces, to at least tend to do so, and certainly to take up the "lost motion" and whatever else there may be of appreciable looseness from between both the joints of the pivot $u$ and those of the several sliding members of the tool-supporting parts situated between $e$ and $h$. As the resultant movement thus produced is by virtue of the peculiar distribution and contour of the parts, as I have above described them, manifestly such as to cause the tool if it move, spring, or swing its supports at all to do so in a direction away from the work, the whole tool-support thus constituted thereby acts substantially as a cranked tool does in its self-relieving capacity. So, too, the tools carried by the sliding parts of the swing-carriages $g$ $f$ for inside and outside working tend on the cutting into the driven work to produce strains which are directed away from their pivots and take up lost motion from between the several jointings of the parts that support them in that outward direction, as well as to cause any deflections which may take place in the sectors themselves to develop motions which are directed away from the work. In fact, the direction of this backing out of the tools thus carried approximates, if it does not exactly coincide with, the circular direction of the motion with which the tools themselves, by virtue of my further preferred contrivance in this respect, may be fed in toward the work, for, besides the slide-rests $e^2$ $f^2$ $g^2$ borne by the carriages $e$ $f$ $g$ as preferred intermediate supports to their preferred tool-holder jaws, the circular tails of the carriages are provided with, first, removably switching or "in and out of gear" circular feed-motion mechanism, best understood by taking Figs. 1, 2, and 6 to 10, inclusive, in conjunction, and, second, with quick-traverse mechanism, and taking the latter of these first I preferably fashion this mechanism as follows: A pinion-wheel $p$, Fig. 5, journaled on a suitable bracket-bearing $p^5$, secured upon, say, the frame-extensions $c^9$ $c^{10}$ $c^{11}$, so that the teeth of said pinion intermesh with the curved rack on said sector-carriage $e$, thereby affords the machine-driver through said pinion's cranked operating-handle $p^2$ a ready means of vibrating the whole carriage upon its trunnion-bearings $c^8$ $c^8$ $c^8$, and thus of quickly fetching it from its operative position (see Figs. 1 and 2) to those positions which, like that illustrated in Fig. 3, may be defined at will within said sector's range of motion, and that range of motion being the same as the length of the racks $e'$ $f'$ $g'$ themselves on all the carriages such quick-swing traverse-motion mechanism enables the operator to quickly remove all obstructions which the carriages, slide-rests, and, in the old forms of boring-mills, their supporting parts would otherwise make over the face-plate O. Moreover, the vibratory movements of the carriages thus primarily produced by similar pinions $p$ $p$ are preferably guided and steadied by the bedways D D D, formed integral upon the upper rims of the subjacent frame-extensions $c^9$ $c^{10}$ $c^{11}$. To this end guide-chairs V and cap-plates $u'$, adjustably bolted thereon, (see Fig. 7,) by embracing the upper and lower lateral flanges $s^2$ $s^2$, Fig. 5, of the serrated ribs $s$ $s$ also assist upon proper adjustment of their clamp-bolts. At other times these clamps may, if desired, serve to securely clamp and anchor the entire swing-carriage body to any established position within its range.

Now the circular feed mechanism above alluded to consists, as I preferably contrive it, primarily of a screw preferably connected with the swing-carriages, as follows, to wit: Adjoining each of them, and preferably with its middle portion located midway between their sector-racks' extreme ranges of action in either direction, there is secured a tangentially-disposed feed-screw H, which co-operates with a registering nut N, Fig. 9, fashioned by its rounded ends $n'$ $n'$ to fit as a ball-jointed member to corresponding concave seats $n$ $n$ of a split sliding block $r$ $r$, which block is embraced and guided by transverse rabbeted guideways $r'$ $r'$, fashioned to face each other on the adjoining inner faces $r^2$ $r^2$ of a pair of similar lugs $R'$ $R'$, which project from the interlocking swing-carriage apron or flap R, Figs. 5 and 11. Said flap's lugs are suitably slotted, as illustrated at $N^2$ in Figs. 6 and 10, both for the free passage endwise through them of the tangent-screw aforesaid as well as for their own transverse sliding across it. By means of this the split sliding blocks $r$ $r$ $r$ $r$ $r$, which are counterparts on all the carriages, are, first, when traversed by the action of the tangent-screws upon the nuts they embrace, free to slide in and out along their respective guide-rabbets in said lugs, (and this happens whenever their nut may be brought out of its central position with relation to the ends of its aforesaid tangent-screw,) and they are also, second, Fig. 2, free to pivot about said screw's body on being disconnected from the serrated circular profiles of the swing-carriage, whereby the apron, still carrying the nut between the split sliding block, may vibrate clear of its carriage, this latter act being accomplished by the slacking off of a releasing-nut K and giving a one-fourth turn to a cruciform or T-headed clamp-bolt $k$. The shaft of this latter bolt, after engaging with said nut and passing through the outwardly-tapering hole $k'$ in said flap's upper body, thence projecting, engages its T-head when placed crosswise with the inner flanges $s^3$ of the slot $s'$, (see Fig. 6;) but if said bolt's head be turned one-fourth of a revolution from such position of complete slot engagement it effects its own release from the slot, and then the flap R may be readily disengaged by withdrawing its curved and serrated inner interrupted face S S from its previous position of interregistration with the adjoining serrated flanges $s$ $s$. Such disconnected position is shown in Fig. 8. On the other hand, a re-engagement of the tangent-screw's nut to said serrated flanges may be easily effected whatever the position of said nut may be along the body of said screw. This is effected by means of a reverse movement, an interlocking of the T-bolt head, and a setting up of the nut K, and to that end an aligning wedge—such as the lug $S'$, (see Fig. 9)—may be fashioned integral upon the intermediate inner body of the pivoted nut-flap apron aforesaid. This is illustrated, Fig. 9, by the endwise section of such wedge, the tapering sides of which correspond to the chamfered mouth-faces of the slot $s'$. Such lugs co-operating with the transverse wedge action of the intergripping serrations themselves I find are well adapted to bring the whole apron-carried mechanism, however loose and shackling when disconnected, fairly home at any desired position of adjustment along the tangent-screw.

Fig. 5 shows the transverse position (to the one just described in connection with the "face-turning" swing-carriage $e$) that the counterpart tangent-screws H H of both the inside and outside turning swing-carriages $g$ $f$ occupy. It also best assists the description of the mode of communicating a rotary motion to these tangent-screws when they are called upon to communicate vibratory feed-motion. Here this screw is shown equipped for either hand or automatic feed-motion, as follows, to wit: After passing through its bracket-bearings B B and finding an abutment in a collar $j'$, fast to one end, the jam-nuts $j$ $j$, longitudinally adjustable along this screw's opposite extension, serve to keep the protruding ends of the screw's body (which are armed, respectively, with a longitudinally-splined pinion $z$ and a fixed crown bevel-gear $z'$) normally within range of their intermeshing fellow gears $w$ $w'$. Of these the latter, when the splined pinion aforesaid is moved to its position of disconnection, (indicated by broken outline in Fig. 1,) serves through the medium of the cranked handle $w^2$ and a bracket journal-spindle $w^3$ to afford the machine-driver the means of rotating the feed-screw by hand; otherwise the gears, intermeshing as drawn, serve to connect said screw with the ordinary mechanical train connecting the feed-motion with the face-plate-actuating mechanisms, which connections are here for all the carriages presumably led out of sight under shelter of the framing and to the rotative mandrel $o$, whence they severally derive motion in the usual way for feed-screws, and therefore need no further mention for the purposes of this specification.

The tops of the pivots $v$ $w$ preferably are crowned by caps or strap-pieces $v^4$, Fig. 4, removably bolted thereto, in order to prevent the accidental lifting from them of the swinging sector-carriages. These caps, however, are not shown in the other views, in order to prevent the confusion of their outline with those of the pivots, and, finally, as the operation of the several parts has been incident to the descriptions of them hereinbefore given, I do not further repeat them, save to point out the capacity which the lengthwise sliding but rotatively-fixed (that is, "longitudinally splined") gears z z z afford the machine-driver to independently connect any or all of the swing-carriages to the actuating mechanism, for the machine thus acquires a peculiarly-controllable as well as individualized automatic feed-motion mechanism. In fact, without detailing other advantages of the above-described structure, whether operating with one tool or all three, I here conclude by pointing out that as three tools T T T operate at three successive parts of the work or circular tire W and almost, if not exactly, in predetermined opposition any one to the other two, the strains they produce tend to neutralize and balance themselves, and their arrangement is thus preventive of center shifting of the work.

Now I am aware that boring and turning mills of the largest size have heretofore been constructed so that their upright frames, supporting the ordinary cross-head traversing carriage and slide-rest members, have been adjustably securable by bolts and T-headed slots along parallel side rails or trackways, between which the lathe-table revolves; and while screws and gear-trains have been in some cases of this sort relied upon to traverse these ponderous uprights from positions such that their tools can be brought to bear on both the inside and outside of such huge cylinders as the turrets of monitors, &c., still I am not aware that they have ever been called upon to act as feed mechanisms for advancing the tools into the work, and similarly I am aware that for the purpose of effecting angular divergence of the tool-slide with respect to the lathe face-plate table or mandrel axis the slide-rests of such machines, even of the smaller sorts, have frequently been pivoted to their respective cross-head traversing carriages, and these, to facilitate their handling, especially when large, provided with circular rack-work and intermeshing pinion-gear. Such constructions, however, are easily distinguished from the novel ones hereinbefore described by me, from the fact that such gearing has been merely to facilitate the assumption of different angular adjustments of these mills' slide-rests, and by no means calculated to effect feed movements thereof.

I am also aware of the pivoted slide and "rise-and-fall screws," used upon what are commonly known to tool-makers as "self-acting slide-lathes;" but, the scope of such mechanism being designedly for the sake of raising and lowering the point of the tool to its proper cutting position in relation to the work, the practice with them is subsequently to rely on the slide-rest mechanisms proper of the lathe to make the feed or work approaching movements of the tool. Thus they are not within the purview of my present invention as above described and hereinafter claimed.

Finally, as to the Fox or brass-finishers' lathes and such other lathes provided with pivotally-connected tool-supports, (of which the lathe described in the United States Patent to Tucker, of December 29, 1874, No. 158,338, may fairly be taken as a type,) such constructions may be distinguished from mine by the fact that they are calculated to support the tool they control chiefly by the compression of their bed-supports, whereas my device, as above declared and illustratively described, is designed to carry its tool chiefly by tensile strains—i. e., to draw apart and relieve rather than to crowd together and compress its bases of support. Moreover, as to the Fox or brass-finishers' lathes, their pivotal carriages usually bank upon a guide-rail and simply facilitate the quick traverse of the slide-rest, or perhaps simple tool-holder, which they carry to and fro from positions of active to non-active, non-interfering range.

What I desire to secure by Letters Patent of the United States, and hereby claim, is—

1. The combination of the rotative boring-mill table with a pivoted tool-carriage adapted to swing within tool-working range of said table, as well as to range backward and outward from said range to non-active, non-interfering, or "clear" position in respect to said table, and operative means for securing said carriage within said working range, substantially as and for the purposes hereinbefore described.

2. The combination of the rotative boring-mill table with pivoted tool-carriages adapted to swing within tool-working range of said table, as well as to range backward and outward from said range to non-active, non-interfering, or clear positions in respect to said table, and a tangent-screw operative for moving and adjustably holding said tool-carriage within the limits of said working range, substantially as and for the purposes hereinbefore described.

3. The combination of the rotative boring-mill table with a pivoted tool-carriage having a guide part or guide parts situated at or near said carriage's margin and adapted to register with a relatively-fixed and concentric lateral guideway or guideways, and said guideway or guideways, the whole operative to maintain said carriage when moving within the "swing range" of said mill-table with great lateral steadiness, as well as to permit of said carriage's retreat backward and outward from said range to non-active, non-interfering, or clear positions in respect to said table, substantially as and for the purposes hereinbefore described.

4. The combination of the rotative boring-mill table with a pivoted tool-carriage, said carriage having a marginal guide part or guide parts, a tool-holder attached to or part of said carriage, a relatively-fixed carriage guideway, and operative means, as clamping-clips and binding-bolts, for adjustably securing said carriage with its said tool-holder within the limits of said table's swing range, substantially as and for the purposes hereinbefore described.

5. The combination of the rotative boring-mill table with a pivoted sector-like tool-carriage having a guide part or guide parts situate at or near said carriage's free or swinging circular margin, a relatively-fixed lateral guideway or guideways therefor, a tool-holder adjustably securable upon said carriage's table adjoining radial side body, as described, and operative means for moving and adjustably securing said carriage in its movements about said guide or guideways, the whole operative to maintain said carriage when bringing said tool-holder within the working or swing range of said table with lateral steadiness, at other times to hold it in desired adjustments relatively to the work, as well as on occasion to permit of said carriage's retreat from the region of said bed, substantially as and for the purposes hereinbefore described.

6. The combination of the rotative boring-mill table with a fixed pivot and a tool-carriage pivotally mounted thereon and having a tool-holder attached to or part of said carriages, the said carriages' pivot being so located with relation to the work and the tool that the center line of pressure produced by the work on the tool when in the act of taking a chip tends in such direction as to swing the tool with its supporting-carriage outward and away from the work, the whole operative substantially as and for the purposes hereinbefore described.

7. The combination of the rotative boring-mill table with a pivoted tool-carriage, a tool-holder adjustably securable to said carriage, and said carriage's pivot, the latter being so fixed and located with relation to the work and the tool that the center line of pressure produced by the work on the tool when in the act of taking a chip tends in such direction as to swing the tool, with its supporting-carriage, outward and away from the work, the whole operative substantially as and for the purposes hereinbefore described.

8. The combination of the rotative boring-mill table with a pivoted tool-carriage having a tool-holder attached to or part of said carriage, said carriage having also a guide part or parts situated at or near its "free" or unpivoted margin, a relatively-fixed lateral guideway or guideways therefor, and said carriage's pivot, the latter so located and fixed with relation to the work and the tool which said holder may support that the center line of pressure produced by the work or chip on the tool tends in such direction as to swing the tool, with its supporting holder and carriage, outward and away from the work, substantially as and for the purposes hereinbefore described.

9. The combination, with the rotative boring-mill table, of a pivoted tool-supporting carriage provided with a tool-holder pivot and a tool-holder adapted to be swung upon and be adjustably securable in relation to said pivot, substantially as and for the purposes hereinbefore described.

10. The combination of the rotative boring-mill table with a pivoted tool-carriage adapted to swing about its pivotal connections to and fro about the swing range of said table, said carriage being provided on its free or swinging part with a tool-holder pivot and a "turret" tool-holder adjustably securable and operatively mounted thereon, substantially as and for the purposes hereinbefore described.

11. The combination of the rotative boring-mill table with two or more pivoted tool-carriages, each having a tool-holder attached to or part of said carriages, respectively, and each adapted to be swung into working range of said table as well as backward and outward from said range to non-active, non-interfering, or clear positions in respect to said table, and operative means, as relatively-fixed guide-beds and clamping-clips, for guiding and on occasion securing said carriages, with their said tool-holders, within the limits of said table's working range, substantially as and for the purposes hereinbefore described.

12. The combination of the rotative boring-mill table with two or more pivoted tool-carriages having each a tool-holder attached to or part of said carriages, said carriages having also a guide part or parts situate at or near said carriages' respective free or unpivoted margin, relatively-fixed lateral guideways therefor, and said carriages' pivots, the latter so fixed and located with relation to the work and the tool that the center line of pressure produced by the work or chip on their tools tends in such directions, respectively, as to swing the respective tools, with their several supporting holders and carriages, each outward and away from the work, substantially as and for the purposes hereinbefore described.

13. The combination of the rotative boring-mill table with a pivoted carriage adapted to swing in a plane parallel to the axis of said table's rotation and carry a tool-holder, and said tool-holder, substantially as and for the purposes hereinbefore described.

14. The combination of the rotative boring-mill table with a pivoted tool-carriage adapted to swing in a plane passing at an angle to the plane of said table's rotation and carry a tool, and said carriage's relatively-fixed pivot, the whole so located that said carriage may swing about said pivot until it shall bring its tool within working range of said table, as well as on occasion upward and outward from said range to non-active, non-interfering, or clear positions in respect to said boring-mill's table, substantially as and for the purposes hereinbefore described.

15. The combination of the rotative boring-mill table with a pivoted tool-carriage adapted to swing in a plane transverse to the axis of said table's rotation and carry a tool-holder, said holder adapted to hold a tool operatively with its cutting-face turned toward the pivotal connections of said carriage, and a feed-screw operative to move said carriage with circular feed-motions across said boring-mill table's swing range, substantially as and for the purposes hereinbefore described.

16. The combination of the rotative boring-mill table with a pivoted carriage adapted to swing in a plane intersecting the plane of said table's rotation and carry a tool-holder, said holder adjustably secured to said carriage and said carriage's relatively-fixed pivot, whereon said carriage may be swung both downward within and upward without or clear of the working or swing range of said table, substantially as and for the purposes hereinbefore described.

17. The combination of the rotative boring-mill table with a pivoted carriage adapted to swing in a plane parallel to the axis of said table's rotation and carry a tool-holder, said holder, and said carriage's relatively-fixed pivot, whereon said carriage may be swung into working range of said table as well as upward and outward from said range to non-active, non-interfering, or clear positions in respect to said mill-table, the said pivot being so fixed and located in respect to the work and the tool which said holder may secure that the center line of pressure produced by the work or chip on the tool tends in such direction as to swing the tool, with its supporting holder and carriage, upward and outward and away from the work, substantially as and for the purposes hereinbefore described.

18. The combination of the rotative boring-mill table with a pivoted carriage adapted to swing in a plane parallel to the axis of said table's rotation and carry a tool-holder, said holder, said carriage's relatively-fixed pivot, whereon said carriage may be swung into working range of said table as well as upward and outward from said range to non-active, non-interfering, or clear positions in respect to said table, and operative means, as the carriage-extension sector and relatively-fixed lateral guideways, for guiding said carriage, with its said tool-holder laterally steadied within the limits of said mill-table's working range, substantially as and for the purposes hereinbefore described.

19. The combination of the rotative boring-mill table with a pivoted carriage adapted to swing in a plane parallel to the axis of said table's rotation and carry a tool-holder, said holder adapted to hold a tool operatively with its cutting-face turned toward the pivotal connections of said carriage, and a feed-screw operative to feed said carriage with circular feed-motions to and fro to said rotative table, substantially as and for the purposes hereinbefore described.

20. The combination of the rotative boring-mill table with two or more pivoted carriages adapted to swing in a plane or planes transverse to the axis of said table's rotation and carry tool-holders, said holders adapted to hold tools, each with its respective cutting face or faces turned toward the pivotal connections of their respective carriages aforesaid, and feed-screws operative to move said carriages with circular feed-motions within said face-table's swing range, substantially as and for the purposes hereinbefore described.

21. The combination, with the boring-mill table, of a pivoted carriage provided upon one extremity with a slide-rest cross-head guideway and upon the other with a sector-like extension having a lateral guide part or guide parts arranged concentric to said carriage's pivot, a fixed pivot whereon said carriage may swing from within range of said rotative table upward and outward to clear positions, a slide-rest registering with and operatively connected to said cross-head, clamp-clips, and fixed guide-bedways, the whole so located and disposed that said slide-rest may be brought into operation within the working swing range of the mill and the tool-carriage there steadied and on occasion anchored by binding said clamps, substantially as and for the purposes hereinbefore described.

22. The combination, with the rotative boring-mill table O, of two pivoted carriages adapted to swing in a plane or planes parallel to said bed, as well as to work upon the same side of the center of rotation of said table and carry tools working substantially in opposition the one to the other, as inside and outside tool-supporting members, respectively, and feed-screws operative to hold or on occasion move said carriages with circular feed-motions, substantially as for the purposes hereinbefore described.

23. The combination of the rotative boring-mill table with two or more pivoted carriages adapted to swing in planes having different angles of divergence in relation to the axis of said lathe's rotation and carry tool-holders, said holders respectively adapted to carry turning-tools with their cutting-faces turned toward the pivotal connections of their respective carriages aforesaid, and feed-screws operative to feed said carriages with circular feed-motions in corresponding angular divergence to the planes of said carriages' swinging movements to and fro within the working range of said rotative table, the whole substantially as and for the purposes hereinbefore described.

24. The combination, with the rotative boring-mill table O, of three pivoted tool-supporting carriages, two of which are adapted, respectively, to carry "boring" and "turning" tools in approximately the same plane, and that plane parallel to said lathe-bed and on the same side of its center, yet in opposition the one to the other, as inside and outside tool-supporting members, and the third of said carriages located opposite to or across the center from said carriage, being adapted to swing in a plane substantially transverse or canted to the plane of operation common to the aforesaid carriages and support a facing-tool, substantially as and for the purposes hereinbefore described.

25. The combination, with the rotative boring-mill table, of a pivoted swinging sector-like tool-supporting carriage, such as $f$ and $g$ are, and clamps $u'\ u'$, adapted to guide said carriage in its motion toward the work or to anchor it to said bed at any desired point, substantially as and for the purposes hereinbefore described.

26. The combination, with the rotative boring-mill table and slide-rest, as $g^2$, of a pivoted sector-like carriage adapted to support said rest within working range of said bed, fixed guide-bearings adapted to support and steady said carriage when in motion, and clamps $u'\ u'$, operative to bind said carriage when in desired adjustments, substantially as and for the purposes hereinbefore described.

27. The combination, with the rotative boring-mill table and traversing slide-rest, as $e^2$, of a pivoted sector-like carriage $e$, provided with an extension Q and a prismatic crosshead $q$, said head forming, as by flanges $q'\ q'$, the cross slideways for said rest and connected by suitable journals with said slide's traverse-screw, fixed segmental guide-bearings adapted to support and steady said carriage when in motion, and clamps $u'\ u'$, operative to fix said carriage to said guides when in desired adjustment relative to said lathe-bed, substantially as and for the purposes hereinbefore described.

28. The combination, with the rotative boring-mill table O, of a pivoted sector-like carriage, as $g$, provided upon its circular rim with a rack, said rack, a rotatably-journaled crank-handle bearing pinion intermeshing with said rack, guide-bearings adapted to maintain said sector-like carriage in correct alignment relatively to the plane of said lathe's rotative table O aforesaid, a slide-rest, as $g^2$, removably secured to said sector-carriage, and a journaled operating tangent-screw adapted to engage removably with said carriage, substantially as and for the purposes hereinbefore described.

29. The combination, with a boring-mill table, of a swinging sector-like carriage, as $g$, said carriage having a T-headed peripheral slot in its circular rim and adjoining said slot, a serrated profile or profiles, a flap, as R, provided with an incurving serrated profile or profiles adapted to register with equal areas of the serration on the sector-rim aforesaid, said flap being provided with projecting transversely-perforated nut-guide lugs, as R' R', a slotted split box having rounded seats and slide-faces, the latter slidingly fitted to said guide-faces of the lugs and adapted to support between its seats the conversely-rounded ends of a tangent-screw feed-nut, said nut, and a tangent-screw journaled to relatively-fixed or "bed" bearings, the whole operative to equip or disconnect said swinging sector-carriage with a relatively-fixed tangent-screw feed mechanism upon occasion, as described.

30. The combination, with the boring-mill bed O, of a pivoted sector-like carriage provided on its circular rim with a rack and on either side of a T-headed peripheral slot with serrated profiles, said rack, a rotatably-journaled crank-handle bearing-pinion intermeshing therewith, segmental guide-bearings adapted to maintain said sector-like carriage in correct predetermined alignment relative to the plane of said lathe's rotative table O aforesaid, a slide-rest, as $g^2$, adapted to be guided and adjustably securable along one of the straight sides of said sector-like carriage, a tangent-screw journaled to said guide-bearing supports or similar fixed portion of the lathe-frame, a flap R, provided with incurving serrated profiles to register with equal areas of the serrations upon the sector-rims aforesaid, said flap being provided with projecting nut-guide lugs R' R', a slotted split box having concave seats, and prismatic slide-faces adapted to slide between said lugs and support the convex ends of a tangent-screw feed-nut, said nut adapted to engage aforesaid tangent-screw, and a T-headed binding-bolt operative to engage with T-slot aforesaid and thereby to effect the engagement and release of said flap and serrated profile of the carriage aforesaid, as desired, a drive-gear splined radially but loose for longitudinal disengagement upon said tangent-screw's shank, and a train of gearing operative on connecting said gear to communicate with the lathe or table rotative mechanism, the whole operative substantially as and for the purposes hereinbefore described.

31. The combination, of a rotative boring-mill table with a pivoted sector-like carriage adapted to swing from clear to and within the working swing range of said table, said carriage having at or near its circular rim rack-work, a rotatably-journaled pinion-wheel intermeshing therewith, and an operating crank-handle secured to said pinion, substantially as and for the purposes hereinbefore described.

32. The combination, with the rotative boring-mill table, of a pivoted carriage, adjustably-securable brackets, as $f^5\ g^5$, and pivotally connected therewith tool-supporting slide-rests, substantially as and for the purposes hereinbefore described.

33. The combination, with the rotative boring-mill table, of a pivoted carriage having a radially-disposed clamping-base, brackets adjustably securable along said base, as $f^5\ g^5$, said brackets being provided with slide-block guideways and tool-holding slide-blocks slidingly connected therewith, and operative mechanism for feeding them along said bracket-guideways, substantially as and for the purposes hereinbefore described.

34. The combination, with the rotative boring-mill table, of a pivoted tool-supporting carriage, said carriage having attached to it a slide-rest guideway, a "slide-rest" attached thereto, operative mechanism for feeding said rest along said slideway of the pivoted carriage, and a tool-holder having a mandible or moving jaw adapted to support thereby a stubby broad-nosed tool, with its cutting-face turned toward the jointings of said slide-rest, substantially as and for the purposes hereinbefore described.

35. The combination, with the rotative boring-mill table, of a tool-supporting carriage pivoted to swing from clear to operative positions ranging within said table's swing range, said carriage being provided with a slide-rest-attaching base, operative means for advancing said carriage with a circular feed-motion, an attachable slide-rest for bearing a tool-holder, said rest being operatively fitted for rectilinear feeding, and said tool-holder pivotally attached to said slide-rest, the whole operative substantially as and for the purposes hereinbefore described.

FREDERICK W. TAYLOR.

Witnesses:
LEWIS R. DICK,
JOSHUA MATLACK, Jr.